US005313795A

United States Patent [19]

Dunn

[11] Patent Number: 5,313,795

[45] Date of Patent: May 24, 1994

[54] CONTROL SYSTEM WITH TRI-PRESSURE SELECTOR NETWORK

[75] Inventor: Donnell L. Dunn, Wausau, Wis.

[73] Assignee: Case Corporation, Racine, Wis.

[21] Appl. No.: 992,436

[22] Filed: Dec. 17, 1992

[51] Int. Cl.[5] .............................................. F16D 31/02

[52] U.S. Cl. ........................................ 60/413; 60/426; 60/428; 91/518

[58] Field of Search ................. 60/420, 426, 459, 466, 60/468, 421, 429, 424, 425, 413, 416, 418, 428, 430; 91/461, 511, 517, 518

[56] References Cited

U.S. PATENT DOCUMENTS

| | | | |
|---|---|---|---|
| 2,309,983 | 2/1943 | Riddle | 60/430 |
| 3,129,781 | 4/1964 | Stein | 60/430 |
| 3,918,847 | 11/1975 | Junck et al. | 60/418 X |
| 4,065,228 | 12/1977 | McMillan | 60/428 X |
| 4,473,090 | 9/1984 | Uehara et al. | 60/421 X |
| 4,517,800 | 5/1985 | Karakama et al. | 60/421 X |
| 4,633,666 | 1/1987 | Karakama | 60/421 |
| 4,648,466 | 3/1987 | Baker et al. | 60/418 X |
| 4,825,659 | 5/1989 | Huydts | 60/425 X |

FOREIGN PATENT DOCUMENTS

| | | | |
|---|---|---|---|
| 1059768 | 6/1959 | Fed. Rep. of Germany | 60/430 |

OTHER PUBLICATIONS

Graphic Symbols for Fluid Power Diagrams, p. 12 Oct. 1967.

*Primary Examiner*—Edward K. Look
*Assistant Examiner*—Hoang Ngyyen
*Attorney, Agent, or Firm*—Jansson & Shupe, Ltd.

[57] ABSTRACT

The invention is an improvement in a control system having first, second and third sources of fluid at differing pressures. The improvement comprises a tripath pressure selector network connected to the first and second sources. A pressure-sensing device connects the network and the third source when the third source is at a predetermined minimum pressure. The invention has particular utility in mobile construction machinery having, e.g., steering, implement and brake hydraulic circuits, at differing pressures. In one embodiment, the third source is a brake hydraulic circuit. The improvement helps assure that adequate pilot pressure is available for a "downstream" pilot control valve.

4 Claims, 3 Drawing Sheets

CONTROL SYSTEM WITH TRI-PRESSURE SELECTOR NETWORK

FIELD OF THE INVENTION

This invention relates generally to control systems and, more particularly, to control systems using a fluid, e.g., hydraulic oil, under pressure.

BACKGROUND OF THE INVENTION

Control systems are in wide use and, as a general statement, function to "multiply" the relatively modest efforts of a machine operator (who manipulates a control device) to provide high-force or high-power output functions well beyond the physical capability of such operator. Such control systems are found in mechanical, electrical and fluid (hydraulic and pneumatic) forms and hybrids of those and other forms. Examples within common experience include the power brakes on an automobile and the electric switch capable of positioning an auto driver's seat (with the driver seated) with but a light touch on such switch.

Another example involves mobile machinery on which various "output" functions are controlled by the operator, often using some type of control system. A more specific example is a front end loader, a type of construction and earthmoving machine. A leading manufacturer of front end loaders and other machinery is Case Corporation of Racine, Wis.

Front end loaders, often mounted on rubber tires, are used to move dirt, rubble and almost any other type of material capable of being picked up by a shovel-like bucket mounted on the front of the machine. In northern climes during winter, such loaders are routinely seen removing piled snow from city streets and loading it into dump trucks.

Front end loaders (as well as many other types of mobile machines) have separate hydraulic systems including separate engine-powered hydraulic pumps which provide hydraulic oil under pressure for vehicle steering, for positioning implements, e.g., the vehicle bucket, and for operating the vehicle brakes. In most modern loaders, the implement-positioning system typically uses hydraulic cylinders for actual implement manipulation. Hydraulic oil under pressure is ported to and from the cylinders by directional valves.

In a larger machine, the implement system is aptly described as a "high horsepower" system in that significant fluid flow rates and fluid pressures are required. Therefore, the directional valves must themselves be large and able to "conduct" at high fluid flow rates and to withstand high flow and high pressure forces. Disregarding the problem of operator hand-to-valve "linkage," such valves do not lend themselves well to manipulation by hand.

In such machines, the directional valves may be positioned away from the operator's compartment (or at least out of easy operator reach) and are constructed to be positioned for bucket raising and lowering, for example, by a hydraulic control pressure rather than by a direct mechanical linkage or the like. Such "pilot operated" valves (as they are often called) have been in wide use for decades.

Such large, high-horsepower pilot operated directional valves are positioned by relatively small, low-effort controller valves, the handles or levers of which are placed to be within easy reach of the machine operator. Using a source of hydraulic pressure as a "power source," such controller valves direct fluid under pressure to the directional valves to position them to, e.g., raise or lower the bucket. In the absence of this power source (or "pilot pressure" as it is often called), the valve spool returns to its center or neutral position under the urging of springs within the valve. Sources of such hydraulic pilot pressure have included the steering and/or implement systems.

These earlier arrangements are characterized by certain disadvantages. In appreciating these disadvantages, it will be helpful to appreciate that fluid pressure (hydraulic or pneumatic) may be developed only if there is fluid flow and resistance to flow.

Consider the analogy of a common garden hose. If the hose has no nozzle and flow is therefore substantially unrestricted, the pressure at the open end of the hose is quite low and water flows freely. On the other hand, if a nozzle restricts flow, the pressure at such end rises appreciably as flow is progressively restricted and/or as flow rate progressively rises. And in either case, when the faucet is nearly or entirely shut off and little or no water flows, there is substantially no pressure at the open end.

It will also be helpful to appreciate aspects of common implement and steering systems. On a front end loader, the pressure in the implement system is a function of the rotational speed of the pump and of the flow "resistance" in the system. When the implement is idle (e.g., a loader bucket is not being raised or lowered), the directional valve is in "neutral." In the neutral position, fluid flows relatively freely through such valve and the system pressure is low, perhaps well below 500 p.s.i. Similarly, if the engine is at low idle and the pump is rotating relatively slowly, system pressure may be very low.

And many vehicle steering systems are not at significant pressure unless the system is being used. That is, system pressure may be very low unless vehicle turning is actually occurring.

Regarding the above-mentioned disadvantages, the operator-manipulated controller valves must have sufficient pilot pressure available to "shift" the large directional valves to, e.g., the bucket raise or bucket lower position. When such pilot pressure is obtained from the implement and/or steering systems, there can be times when such pressure is insufficient for directional valve shifting. This disadvantage can (and does) manifest itself in unusual and annoying ways.

One way a front end loader is commonly used is to smooth an earthen surface by, perhaps, spreading loose dirt across the surface or by smoothing already-loosened dirt. In so doing, the operator positions the loader so that loose dirt is behind the bucket. The bucket directional valve is then placed in the "float" position (using a pilot-pressure controller valve) and the bucket "backdragged" (by driving the vehicle backwards) so that the curved rear portion of the bucket smooths the earth.

It is to be noted that retention of the directional valve in the "float" position requires that its flow-directing spool be retained at such position by a pilot pressure of some minimum value. Absent such pressure, the directional valve shifts (under the urging of its internal springs) to another position, the bucket is forced downward and the surface intended to be smoothed is, in fact, gouged. Such an eventuality can be disconcerting to the operator and takes valuable time to repair.

Described more broadly, the absence of a consistently-available pilot pressure source may prevent the vehicle from being used to its fullest, most productive advantage.

OBJECTS OF THE INVENTION

It is an object of the invention to provide an improved control system overcoming some of the problems and shortcomings of the prior art.

Another object of the invention to provide an improved control system for providing a more consistently available pilot pressure.

Still another object of the invention to provide an improved control system which helps avoid reliance upon only vehicle implement and/or steering systems for pilot pressure.

Another object of the invention to provide an improved control system utilizing a third source of pilot pressure, e.g., a braking system.

Yet another object of the invention to provide an improved control system which utilizes the third source only when such source is at a predetermined minimum pressure.

Another object of the invention to provide an improved control system which helps use the controlled machine to its fullest, most productive advantage. How these and other objects are accomplished will become more apparent from the following descriptions and from the drawing.

SUMMARY OF THE INVENTION

The invention is an improvement in a control system of the type having first, second and third sources of fluid at differing pressures. The improvement comprises a tri-path pressure selector network connected to the first and second pressure sources. A pressure-sensing device connects the network and the third source when the third source is at a predetermined minimum pressure. The invention is described in connection with a control system for use on mobile construction machinery such as front end loaders. In a control system application of that type, the fluid pressure sources may include the steering system, the implement (bucket) power system and the braking system as the first, second and third sources, respectively.

In one highly preferred embodiment, the third source includes one or, for redundancy, two fluid accumulators. The pressure-sensing device (which is preferably connected to only one of the accumulators in a plural-accumulator system), connects the network and the third source only when one of the accumulators, e.g., the second accumulator is at a predetermined pressure.

The control system may be used to provide pilot pressure to a separate device for which such pilot pressure constitutes the "power source." An example of such a device is a pilot controller valvc having a minimum operating pressure. The pressure selector network is connected to the pilot controller valve and the predetermined minimum pressure is in excess of the minimum operating pressure of such controller valve. Most such devices need some minimum level of pilot pressure to function properly and in one embodiment, the predetermined pressure is in excess of about 600 p.s.i., i.e., the minimum pilot pressure.

More specifically, the third source and the pressure selector network are connected by a pressure line. In a highly preferred embodiment, the pressure-sensing device includes a sequence valve and the system includes a check valve in the pressure line, preferably interposed between the pressure-sensing device and the third source. Such check valve permits fluid flow from the third source to the network but prevents "back flow," i.e., prevents fluid from the first and second sources from flowing to the third source. If the pressure-sensing device is a sequence valve, such valve provides generally the same "back-flow-preventing" function and the check valve is for redundancy.

The sequence valve opens and closes in response to the pressure in its pilot signal line which is connected to the pressure line extending between the network and the third source. In one arrangement, such pilot signal line is connected between the pressure-sensing device and the check valve. In another arrangement, the pilot signal line is connected between the check valve and the third source.

Further details of the invention are set forth in the following detailed description and the drawing.

DETAILED DESCRIPTIONS OF PREFERRED EMBODIMENTS

Before describing the improved control system 10, an understanding of an exemplary application for such system 10 will be helpful.

Figure 1:
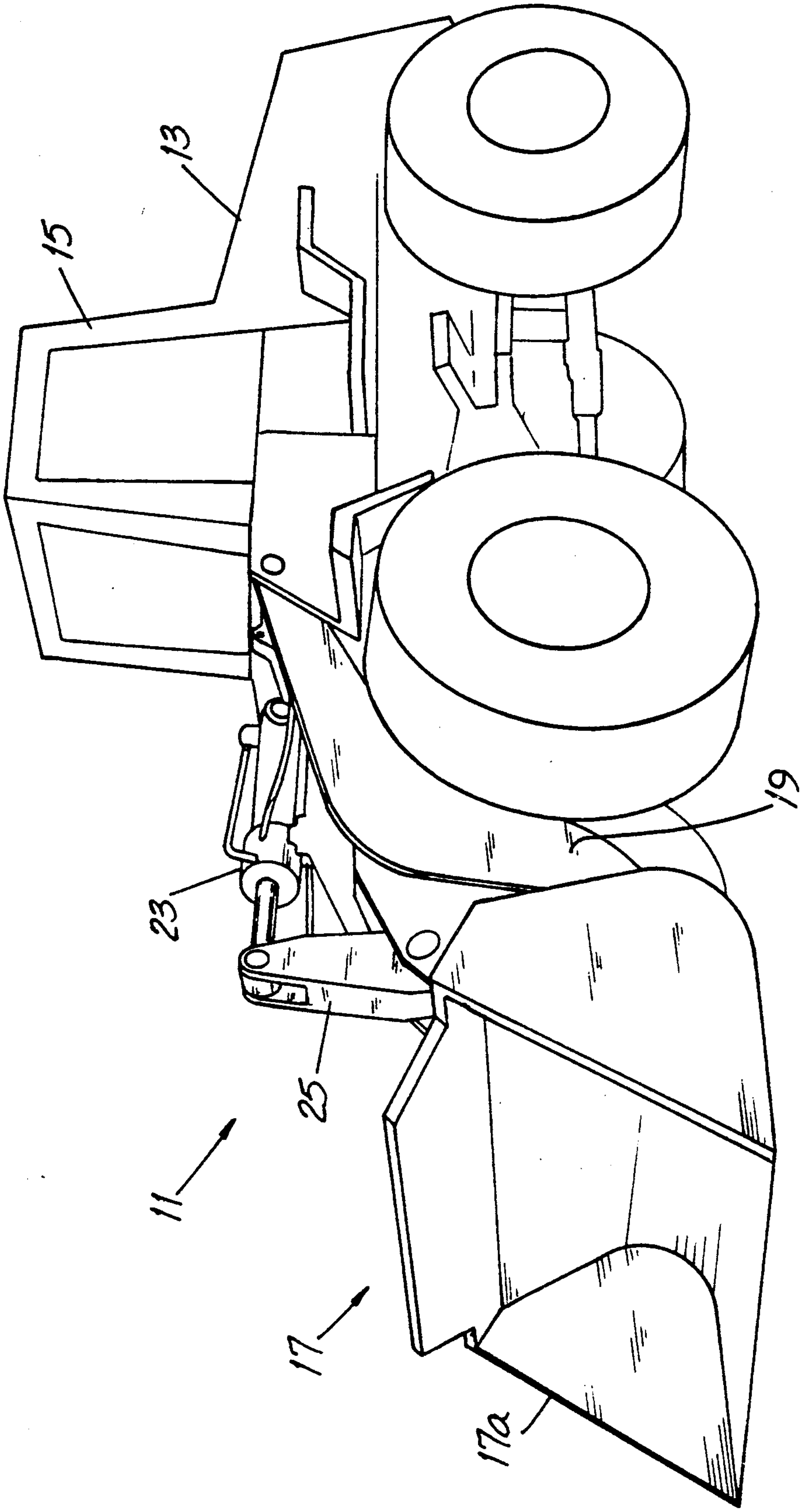
FIG. 1 is a representative perspective view of a front end loader, an exemplary one of many types of machines which benefit from the invention.

Referring to FIG. i, the exemplary front end loader 11 (often called a wheel loader) has an engine compartment 13, an operator's compartment 15 and a working implement 17 such as a bucket 17*a*. Such bucket 17*a*, which can have a capacity of several cubic yards of material, is pivotably mounted on and raised and lowered by "arms" 19 positioned by hydraulic cylinders 21 not readily visible in FIG. 1 but represented by the symbols in FIG. 2. Such bucket 17*a* is also pivoted up and down on the arms 19 by another hydraulic cylinder 23 attached between the loader chassis and a lever arm 25.

Figure 2:
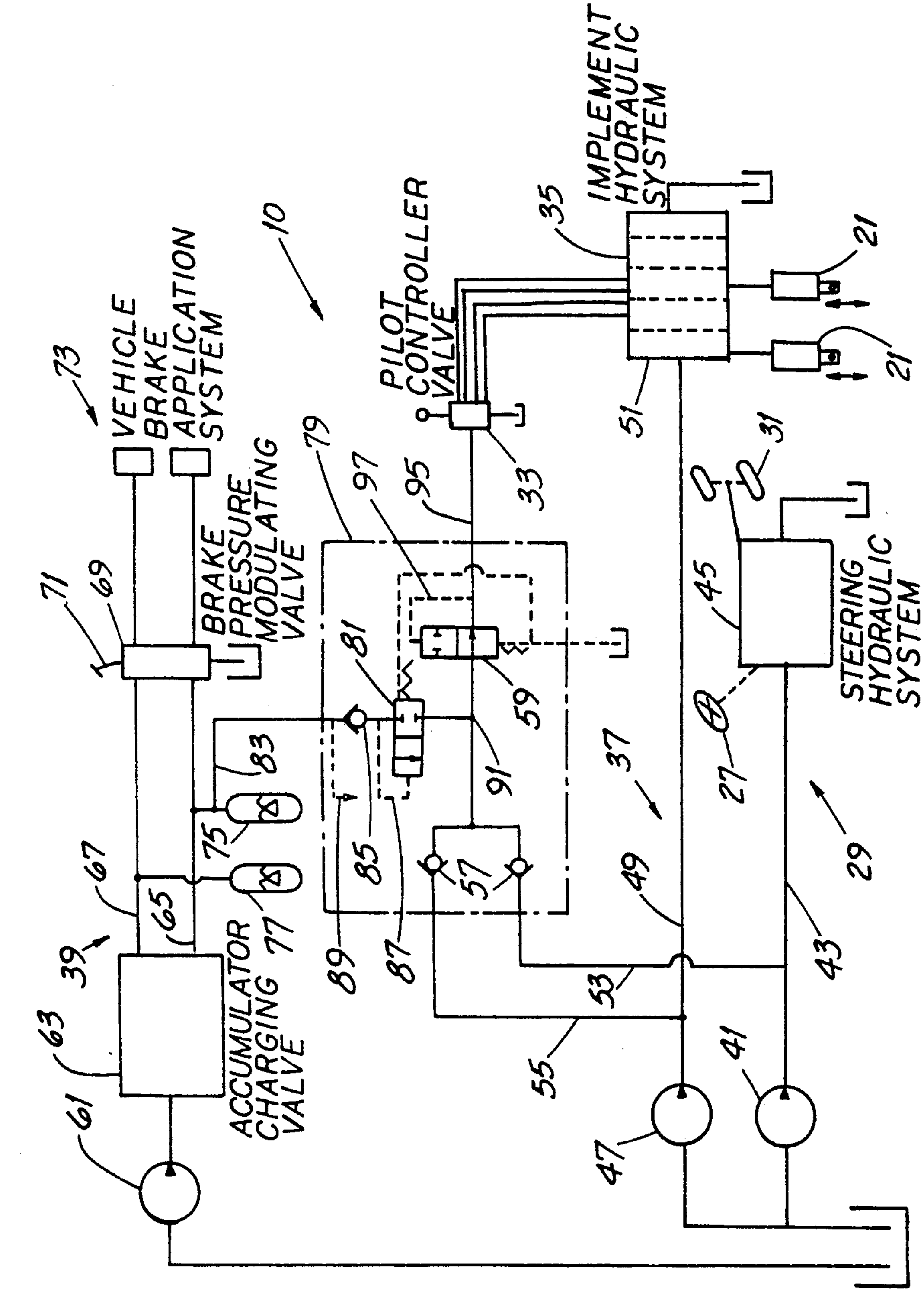
FIG. 2 is a schematic hydraulic circuit diagram showing aspects of the invention.

Referring further to FIG. 2, the operator's compartment 15 has a conventional steering wheel 27 for steering the loader 11 using a power steering system 29. The operator's wheel 27 and the steered wheels 31 are represented by the symbols identified by the same numbers. Such compartment 15 also has mounted therein a pilot controller valve 33 which is a relatively small, multi-handle valve manipulated by the operator to position and control much larger hydraulic directional valves 35.

An understanding of aspects of such directional valves 35 will be helpful in appreciating the invention. Such valves 35 have a body and a spool which moves in the body to perform valving functions. Directional valves are available at least for manual, electric solenoid or pilot-pressure positioning of the spool. The exemplary valves 35 represented in FIG. 2 are of the type having spools positioned by hydraulic pilot pressure. Often, the valve spool is centered at a neutral position by springs, one at either end of the spool. Such spool is shifted (against spring force) to a "working" position, e.g, to move the loader bucket up or down, by pressurizing one end or the other of the spool. In general, the pressure required to shift the spool is a function of the valve design but in larger valves, such pressures in the range of 300–600 p.s.i. are not uncommon.

The illustrated system 10 includes three sources of pressure, namely, the steering system 29, the implement system 37 and the brake system 39. The function of each such system will now be explained.

The power steering system 29 includes a steering pump 41, the output flow of which is directed along a flow line 43 to a conventional hydraulic steering assembly 45. The implement system 37 includes an implement pump 47, the output flow of which is directed along another flow line 49 to a hydraulic assembly 51 comprising plural directional control valves 35 for extending and retracting hydraulic cylinders 21, 23. A control pressure line 53, 55 is connected to each flow line 43 and 49, respectively and such lines 53, 55 are joined through check valves 57 and a pressure reducing valve 59 to the pilot controller valve 33.

Similarly, the vehicle hydraulic braking system 39 includes a brake pump 61, the output flow of which is directed through an accumulator charging valve 63 along two lines 65, 67 to a brake pressure modulating valve 69 (operated by the brake pedal 71 in the operator's compartment 15) to the vehicle brake application system 73. The braking system 39 has a separate flow line 65, 67 to each of two sets of brake shoes and in this regard, such system 39 is similar to the "split" braking systems on modern automobiles. That is, if one flow line fails, another set of brakes is nevertheless available.

The braking system 39 includes first and second accumulators 75, 77 (bottle-like devices containing fluid under pressure), one connected to each flow line 65, 67, respectively. The accumulators 75, 77 are generally maintained at some minimum pressure, e.g., 1400 p.s.i. in the exemplary system 39, by the accumulator charging valve 63. The reason for such accumulators 75, 77 is that if the vehicle engine dies (and, therefore, the pump 61 stops running), the accumulators 75, 77 still provide a quantity of pressurized fluid so that the vehicle can be braked.

Figure 3:
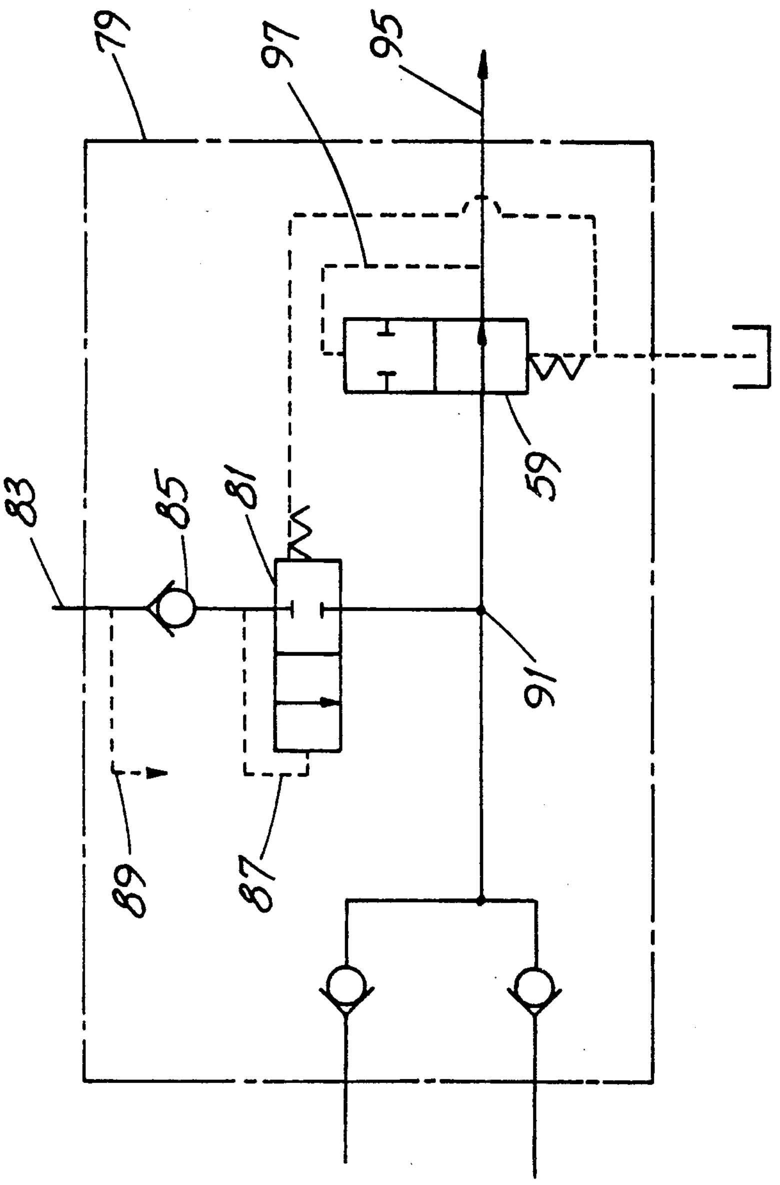
FIG. 3 is a schematic hydraulic circuit diagram of a portion of FIG. 2 and showing a tri-path pressure selector network.

Referring additionally to FIG. 3, the improvement comprises a tri-path pressure selector network 79 connected to the first and second sources 41, 47. Such network 79 has a pressure sensing device 81, preferably a sequence valve, connecting the network 79 and the third source 39 when the pressure in the third source 39 is at a predetermined minimum pressure value equal to the set point pressure of the device 81. Preferably, such minimum pressure is in excess of the minimum operating pressure required by the pilot controller valve 33. It should be appreciated that such minimum operating pressure is primarily dictated by the characteristics of the directional valves 35 (specifically, the pressure required to reliably shift them from one position to another) rather than by some aspect of the pilot controller valve 33.

In an arrangement having plural accumulators 75, 77, it is highly preferred that the pressure sensing device 81 connects the network 79 and only one of the accumulators 75 or 77. The reason is that if a rupture should occur in the line 83, such rupture will not result in bleeding pressurized fluid from both accumulators 75, 77.

Preferably, the improvement also includes a check valve 85 in the line 83 for preventing pressurized fluid from flowing from the first and/or second sources 29, 37 to the third source 39. It should be appreciated that like water in the example of the garden hose mentioned above, fluid flows from a region of higher pressure to a region of lower pressure. In the event of a break in the line 83, such check valve 85 helps prevent pressurized fluid from the first and/or second source 29, 37 from "backflowing" toward the third source 39 and out the break. In the exemplary embodiment, the check valve 85 is interposed between the device 81 and the third source 39.

The pressure sensing device 81 is spring-biased to a normally closed position (as symbolically illustrated) and opens only if the pressure in the line 83, as sensed by the device pilot signal line 87, exceeds the predetermined setting (or "set point") of the device 81. The pilot signal line 87 may be connected between the pressure-sensing device 81 and the check valve 85 as illustrated or between the check valve 85 and the third source 39 as represented by the dashed line 89.

In the exemplary embodiment, the device 81 pressure set point is in the range of 1000–1600 p.s.i. and, most preferably, about 1400 p.s.i. Therefore, a break in the line 83 will likely result in a pressure in that line 83 which is below such setting and the device 81 will not open. Such device 81 thereby also prevents backflow and in that regard, the check valve 85 and the device 81 are redundant.

It will be appreciated from the foregoing that the pressure of the fluid at the junction 91 will be equal to the greatest of the pressures in the first, second and third sources 29, 37 and 39, respectively. Such fluid is directed to a pressure reducing valve 59, a device which is spring-biased to a normally open position as symbolically illustrated. When the valve 59 is open, pressurized fluid flows to the controller valve line 95 to provide a "power source" used by the controller valve 33 to operate the directional valves 35.

In one examplary embodiment, this power source (the pressurized fluid in the line 95) is preferably at about 500–550 p.s.i. Of course, the pressures and ranges of pressure may, depending upon the application, be different (perhaps dramatically different) from those mentioned in this specification. Such differences are clearly contemplated by the invention.

When the pressure in the line 95 reaches the set point value of the valve, e.g., 500–550 p.s.i., as sensed by the valve pilot signal line 97, the valve 59 starts to "choke off" or modulate by partially closing. Assuming the pressure at the junction 91 remains above such set point value, the valve 59 continues to modulate retain the desired pressure in the line 95, 500–550 p.s.i. in this example.

A few observations accompanied by specific examples will further illuminate the invention. It is first assumed that the vehicle engine is at low idle and the bucket **17*a* is not in use. Therefore, the pressures in the first and second sources 29, 37 are apt to be well below the minimum operating pressure required by the directional valves 35 and, therefore, by the pilot controller valve 33. It will also be assumed that the pressures in the first and second sources 29, 37 are about 200 p.s.i. and that the nominal "spool shifting" pressure required by the valve 33** is about 550 p.s.i.

Even at engine idle, the brake pump 61 delivers enough fluid to eventually "charge" the accumulators 75, 77 to the pressure desired for possible brake actuation and it is assumed that such pressure is above about 1400 p.s.i. It is also assumed that the set point of the pressure sensing device 81 is somewhat below 1400 p.s.i. and, therefore, the device 81 opens and brings the pressure 91 at the junction to about that value. Since the sources 29 and 37 are at about 200 p.s.i., the check valves 57 prevent the pressurized fluid at the junction 91 from bleeding to one or both of the sources 29, 37. The pressure reducing valve 59 functions to reduce the pressure in the line 95 to about 550 p.s.i. so that the pilot controller valve 33 may be used to reliably operate the directional valves 35 without over-pressuring such valves 35.

It is next assumed that the engine speed is increased and either the vehicle is being steered or the bucket 17*a* is being used to lift a load. It is also assumed that since pressure rises in response to load, such steering or bucket use raises the pressures in the first and second sources 29 and 37, respectively, to 1900 p.s.i. A further assumption is that the accumulators 75, 77 are charged to a pressure of about 1400 p.s.i.

At that accumulator pressure, the pressure sensing device 81 opens. However, since the pressure in the sources is well above 1400 p.s.i., e.g., 1900 p.s.i., the pressure at the junction 91 will be 1900 p.s.i. and the check valve 85 prevents such pressure from bleeding to the third source 39. The pressure reducing valve 59 modulates the fluid pressurized at 1900 p.s.i. to reduce it to about 550 p.s.i. for use by the controller valve 33 in operating the directional valves 35.

While the principles of the invention have been shown and described in connection with specific embodiments, it is to be clearly understood that such embodiments are by way of example and not of limitation.

I claim:

1. In a control system having first, second and third sources of fluid at differing pressures, the improvement comprising:
   - a tri-path pressure selector network connected to the first and second sources;

and wherein:
   - the third source includes first and second accumulators; and,
   - a pressure-sensing device connects the network and the third source only when the second accumulator is at a pressure in excess of about 600 p.s.i.

2. In a control system having first, second and third sources of fluid at differing pressures, the improvement wherein:
   - a tri-path pressure selector network is connected to the first and second sources;
   - the third source includes a first and second accumulators; and,
   - a pressure-sensing device connects the network and the second accumulator when the second accumulator is at a predetermined pressure.

3. In a control system having first, second and third sources of fluid at differing pressures, the improvement comprising:
   - a tri-path pressure selector network connected to the first and second sources;
   - the third source and the pressure selector network are connected by a pressure line;
   - a check valve is in the pressure line for preventing fluid from the first and second sources from flowing to the third source;
   - a pressure-sensing sequence valve has a pilot signal line connected to the pressure line;
   - the sequence valve connects the third source to the network when the third source is at a predetermined minimum pressure;
   - the check valve is interposed between the pressure-sensing device and the third source; and,
   - the pilot signal line is connected between the sequence valve and the check valve.

4. In a control system having first, second and third sources of fluid at differing pressures, the improvement comprising:
   - a tri-path pressure selector network connected to the first and second sources;
   - the third source and the pressure selector network are connected by a pressure line;
   - a check valve is in the pressure line for preventing fluid from the first and second sources from flowing to the third source;
   - a pressure-sensing sequence valve has a pilot signal line connected to the pressure line;
   - the sequence valve connects the third source to the network when the third source is at a predetermined minimum pressure;
   - the check valve is interposed between the pressure-sensing device and the third source; and,
   - the pilot signal line is connected between the check valve and the third source.

* * * * *